United States Patent
Massari et al.

(10) Patent No.: US 11,376,829 B2
(45) Date of Patent: Jul. 5, 2022

(54) PERMEABLE POLYMER FILM

(71) Applicant: BASELL POLIOLEFINE ITALIA S.R.L., Milan (IT)

(72) Inventors: Paola Massari, Ferrara (IT); Andrea Felisati, Ferrara (IT); Marco Izzi, Frankfurt (DE); Claudio Cavalieri, Ferrara (IT); Davide Tartari, Ferrara (IT); Isabella Maria Vittoria Camurati, Ferrara (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 185 days.

(21) Appl. No.: 16/971,609

(22) PCT Filed: Feb. 13, 2019

(86) PCT No.: PCT/EP2019/053512
§ 371 (c)(1),
(2) Date: Aug. 20, 2020

(87) PCT Pub. No.: WO2019/166223
PCT Pub. Date: Sep. 6, 2019

(65) Prior Publication Data
US 2020/0384749 A1    Dec. 10, 2020

(30) Foreign Application Priority Data
Feb. 28, 2018  (EP) ..................... 18159267

(51) Int. Cl.
*B32B 27/32*  (2006.01)
*B32B 27/08*  (2006.01)
*C08L 23/12*  (2006.01)
*C08L 23/16*  (2006.01)

(52) U.S. Cl.
CPC ............ *B32B 27/32* (2013.01); *B32B 27/08* (2013.01); *C08L 23/12* (2013.01); *C08L 23/16* (2013.01); *B32B 2323/10* (2013.01); *C08L 2201/10* (2013.01); *C08L 2203/16* (2013.01); *C08L 2205/02* (2013.01)

(58) Field of Classification Search
CPC ......... B32B 27/32; B32B 27/08; C08L 23/16; C08L 23/12; C08L 2323/10; C08L 2205/02; C08L 2201/10; C08L 2323/16
See application file for complete search history.

(56) References Cited

U.S. PATENT DOCUMENTS

2001/0034416 A1*  10/2001  Takayanagi ............. C08L 23/10
                                                    525/240
2021/0054180 A1*  2/2021  Toltsch ................ C08K 5/0083

FOREIGN PATENT DOCUMENTS

| EP | 9987290 A1 | 3/2000 |
| WO | 9718084 A1 | 5/1997 |
| WO | 2006120190 A1 | 11/2006 |
| WO | 2015117948 A1 | 8/2015 |

OTHER PUBLICATIONS

International Search Report and Written Opinion dated Apr. 15, 2019 (Apr. 15, 2019) for corresponding PCT/EP2019/053512.

* cited by examiner

*Primary Examiner* — Samir Shah

(57) ABSTRACT

A multilayer film made from or containing a core layer made from or containing a polypropylene composition made from or containing:
A) from 90 wt % to 50 wt %; of a propylene homopolymer; and
B) from 10 wt % to 50 wt %; of a propylene ethylene copolymer having:
  i) xylene soluble fraction at 25° C. ranging from 14 wt % to 27 wt %;
  ii) intrinsic viscosity of the fraction soluble in xylene at 25° C. ranging from 1.0 to 2.4 dl/g;
  iii) melt flow rate ranging from 1.0 g/10 min to 4.0 g/10 min;
  iv) an ethylene content ranging from 5.0 wt % to 12.0 wt %;
  v) the ethylene derived units content on the fraction insoluble in xylene at 25° C. ranging from 2.5 wt % to 6.0 wt %;
  vi) the ethylene derived units content on the fraction soluble in xylene at 25° C. ranging from 15.2. wt % to 30.2 wt %,
the sum of A) and B) being 100 wt %.

13 Claims, No Drawings

PERMEABLE POLYMER FILM

This application is the U.S. National Phase of PCT International Application PCT/EP2019/053512, filed Feb. 13, 2019, claiming benefit of priority to European Patent Application No. 18159267.6, filed Feb. 28, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polymer film, including polymers films for food packaging.

BACKGROUND OF THE INVENTION

In some instances, polypropylene films as well as biaxially oriented polypropylene films (BOPP) are used for the packaging of foodstuff using automatic machines. In some instances, the films have a good balance of processability ("machinability"), optical and mechanical properties, and low permeability to gases and water vapor. In some instances, the gases are oxygen or carbon dioxide.

For the packaging of fresh foods, greater gas transmission rates are sought. Because the metabolic activity of vegetable cells continues after fresh foods are harvested, cleaned and cut into pieces, the cells of the fresh foods continue consuming oxygen and emitting carbon dioxide and water vapor. In a closed package, this process changes the atmosphere inside the package, making the environment detrimental for the metabolic activity yet favorable for the development of harmful micro-organisms.

In some instances, the oxygen and water vapor transmission rate of films made from or containing propylene homopolymers are low and can be increased.

SUMMARY OF THE INVENTION

In a general embodiment, the present disclosure provides a multilayer film made from or containing a core layer made from or containing a polypropylene composition made from or containing:

A) from 90 wt % to 50 wt %; of a propylene homopolymer having a fraction insoluble in xylene at 25° C. greater than 90 wt %, based upon the total weight of the propylene homopolymer; and B) from 10 wt % to 50 wt %; of a propylene ethylene copolymer having:

i) xylene soluble fraction at 25° C. ranging from 14 wt % to 27 wt %, based upon the total weight of the propylene ethylene copolymer;

ii) intrinsic viscosity of the fraction soluble in xylene at 25° C. ranging from 1.0 to 2.4 dl/g;

iii) melt flow rate, MFR, measured according to ISO 1133 at 230° C. with a load of 2.16 kg, ranging from 1.0 g/10 min to 4.0 g/10 min;

iv) an ethylene derived units content ranging from 5.0 wt % to 12.0 wt %, based upon the total weight of the propylene ethylene copolymer;

v) the ethylene derived units content on the fraction insoluble in xylene at 25° C. ranging from 2.5 wt % to 6.0 wt %, based upon the total weight of the propylene ethylene copolymer;

vi) the ethylene derived units content on the fraction soluble in xylene at 25° C. ranging from 15.2. wt % to 30.2 wt %, based upon the total weight of the propylene ethylene copolymer; and vii) the $C^{13}$ NMR sequences PEP measured on the fraction insoluble in xylene at 25° C. ranging from 3.5 mol % to 5.5 mol % and the $C^{13}$ NMR sequences PEP measured on the fraction soluble in xylene at 25° C. ranging from 11.0 mol % to 14.2 mol %;

the sum of the amounts of A) and B) being 100 wt %.

DETAILED DESCRIPTION OF THE INVENTION

In some embodiments, the present disclosure provides a multilayer film made from or containing a core layer made from or containing a polypropylene composition made from or containing:

A) from 90 wt % to 50 wt %; alternatively from 85 wt % to 55 wt %; alternatively from 80 wt % to 65 wt % of a propylene homopolymer having a fraction insoluble in xylene at 25° C. greater than 90 wt %; alternatively greater than 94 wt %, based upon the total weight of the propylene homopolymer; and B) from 10 wt % to 50 wt %; alternatively from 15 wt % to 45 wt %; alternatively from 20 wt % to 35 wt % of a propylene ethylene copolymer having:

i) xylene soluble fraction at 25° C. ranging from 14 wt % to 27 wt %; alternatively from 17 wt % to 25 wt %; alternatively from 18 wt % to 22 wt, based upon the total weight of the propylene ethylene copolymer;

ii) intrinsic viscosity of the fraction soluble in xylene at 25° C. ranging from 1.0 to 2.4 dl/g; alternatively from 1.5 to 2.2 dl/g; alternatively from 1.7 to 2.1 dl/g;

iii) melt flow rate, MFR, measured according to ISO 1133 at 230° C. with a load of 2.16 kg, ranging from 1.0 g/10 min to 4.0 g/10 min; alternatively from 1.4 g/10 min to 3.2 g/10 min; alternatively from 1.6 g/10 min to 2.1 g/10 min;

iv) an ethylene derived units content ranging from 5.0 wt % to 12.0 wt %, based upon the total weight of the propylene ethylene copolymer;

v) the ethylene derived units content on the fraction insoluble in xylene at 25° C. ranging from 2.5 wt % to 6.0 wt %; alternatively ranging from 3.2 wt % to 5.2 wt %; alternatively ranging from 3.5 wt % to 5.0 wt %, based upon the total weight of the propylene ethylene copolymer;

vi) the ethylene derived units content on the fraction soluble in xylene at 25° C. ranging from 15.2. wt % to 30.2 wt %; alternatively ranging from 17.2 wt % to 24.8 wt %; alternatively ranging from 18.2 wt % to 22.8 wt %, based upon the total weight of the propylene ethylene copolymer; and vii) the $C^{13}$ NMR sequences PEP measured on the fraction insoluble in xylene at 25° C. ranging from 3.5 mol % to 5.5 mol %; alternatively ranging from 3.8 mol % to 5.2 mol %; alternatively ranging from 3.9 mol % to 4.8 mol % and the $C^{13}$ NMR sequences PEP measured on the fraction soluble in xylene at 25° C. ranging from 11.0 mol % to 14.2 mol %; alternatively ranging from 11.5 mol % to 13.8 mol %; alternatively ranging from 12.3 mol % to 13.5 mol %;

the sum of the amounts of A) and B) being 100 wt %.

As used herein, the term "copolymer" refers to polymers containing two kinds of comonomers. In some embodiments, the comonomers are propylene and ethylene.

As used herein, the term "core layer" refers to the layer in a multilayer film having no contact with the external environment. For example, in a three-layer A/B/A film, the B layer is the core layer.

In some embodiments and in the propylene ethylene copolymer B), the $C^{13}$ NMR sequences PEE measured on the fraction soluble in xylene at 25° C. range from 7.2 mol % to 12.0 mol %; alternatively range from 8.3 mol % to 11.2 mol %.

In some embodiments and in the propylene ethylene copolymer B), the $C^{13}$ NMR sequences EEE measured on the fraction soluble in xylene at 25° C. are lower than 6.5 mol %, alternatively in a range from 5.9 mol % to 2.0 mol %.

In some embodiments and in the propylene ethylene copolymer B), the ratio r1r2 of the fraction insoluble in xylene at 25° C. measured with $C^{13}$ NMR is between 2.4 and 4.6; alternatively between 2.9 and 4.1; alternatively between 3.1 and 3.8.

In some embodiments, the multilayer films have a core layer made from or containing the polypropylene composition. In some embodiments, the remaining layers are formed of another material for use in multilayer films or in laminated products. In some embodiments, each layer is made from or contains a polypropylene homopolymer or copolymer or a polyethylene homopolymer or copolymer or another polymer. In some embodiments, the other polymer is EVA.

The combination and number of layers of the multilayer structures described are not limited. In some embodiments, the multilayer structure is made from or contains 3-11 layers or more, alternatively 3-9 layers, alternatively 3-7 layers, alternatively 3-5 layers, with combinations including A/B/A, A/B/C, A/B/C/B/A, and A/B/C/D/C/B/A, provided that a core layer such as B or D is made from or contains a propylene composition.

In some embodiments, the number of layers of the multilayer film is 3 or 5, wherein a core layer is made from or contains a propylene composition. In some embodiments, the structures are A/B/A or A/B/C, wherein B is a propylene composition.

In some embodiments, component A is a homopolymer of propylene available commercially as Moplen HP522H, Moplen HP520H, Moplen HP525J, or Moplen HP526J.

In some embodiments, propylene ethylene copolymer component B) is obtained with a process carried out in a reactor having two interconnected polymerization zones, a riser and a downcomer, wherein growing polymer particles:
(a) flow through the first polymerization zone, the riser, under fast fluidization conditions in the presence of propylene and of ethylene;
(b) leave the riser and enter the second polymerization zone, the downcomer, through which the growing polymer particles flow downward in a densified form in the presence of propylene and of ethylene, wherein the concentration of ethylene in the downcomer is higher than in the riser; and
(c) leave the downcomer and are reintroduced into the riser, thereby establishing a circulation of polymer between the riser and the downcomer.

In the first polymerization zone (riser), fast fluidization conditions are established by feeding a gas mixture made from or containing one or more alpha-olefins at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In the second polymerization zone (downcomer), the polymer particles flow under the action of gravity in a densified form, thereby achieving the high values of density of the solid (mass of polymer per volume of reactor) and approaching the bulk density of the polymer. As used herein, the term "densified form" of the polymer indicates that the ratio between the mass of polymer particles and the reactor volume is higher than 80% of the "poured bulk density" of the polymer. In the downcomer, the polymer flows downward in a plug flow. In some embodiments, small quantities of gas are entrained with the polymer particles.

In some embodiments, the two interconnected polymerization zones are operated such that the gas mixture coming from the riser is totally or partially prevented from entering the downcomer by introducing, into the upper part of the downcomer, a liquid or gas stream, denominated "barrier stream", having a composition different from the gaseous mixture present in the riser. In some embodiments, one or more feeding lines for the barrier stream are placed in the downcomer close to the upper limit of the volume occupied by the polymer particles flowing downward in a densified form.

In some embodiments, this liquid/gas mixture fed into the upper part of the downcomer partially replaces the gas mixture entrained with the polymer particles entering the downcomer. The partial evaporation of the liquid in the barrier stream generates in the upper part of the downcomer a flow of gas, which moves counter-currently to the flow of descending polymer, thereby acting as a barrier to the gas mixture coming from the riser and entrained among the polymer particles. In some embodiments, the liquid/gas barrier fed to the upper part of the downcomer is sprinkled over the surface of the polymer particles. In some embodiments, the evaporation of the liquid provides the upward flow of gas.

In some embodiments, the feed of the barrier stream causes a difference in the concentrations of monomers or hydrogen (molecular weight regulator) inside the riser and the downcomer, thereby producing a bimodal polymer.

In some embodiments, the gas-phase polymerization process involves a reaction mixture made from or containing the gaseous monomers, inert polymerization diluents and chain transfer agents to regulate the molecular weight of the polymeric chains. In some embodiments, hydrogen is used to regulate the molecular weight. In some embodiments, the polymerization diluents are selected from C2-C8 alkanes, alternatively propane, isobutane, isopentane and hexane. In some embodiments, propane is used as the polymerization diluent in the gas-phase polymerization.

In some embodiments, the barrier stream is made from or contains:
 i. from 10 to 100% by mol of propylene, based upon the total moles in the barrier stream;
 ii. from 0 to 80% by mol of ethylene, based upon the total moles in the barrier stream;
 iii. from 0 to 30% by mol of propane, based upon the total moles in the barrier stream; and
 iv. from 0 to 5% by mol of hydrogen, based upon the total moles in the barrier stream.

In some embodiments, the composition of the barrier stream is obtained from the condensation of a part of the fresh monomers and propane, wherein the condensed part is fed to the upper part of the downcomer in a liquid form. In some embodiments, the composition of the barrier stream is derived from condensation or distillation of part of a gaseous stream continuously recycled to the reactor having two interconnected polymerization zones.

In some embodiments, additional liquid or gas is fed along the downcomer at a point below the barrier stream.

In some embodiments, the recycle gas stream is withdrawn from a gas/solid separator placed downstream the riser, cooled by passage through an external heat exchanger and then recycled to the bottom of the riser. In some embodiments, the recycle gas stream is made from or contains the gaseous monomers, the inert polymerization components, and chain transfer agents. In some embodiments, the inert polymerization components include propane. In some embodiments, the chain transfer agents include hydrogen. In some embodiments, the composition of the barrier stream deriving from condensation or distillation of the gas recycle stream is adjusted by feeding liquid make-up monomers and propane before the gas recycle stream's introduction into the upper part of downcomer.

In some embodiments and in both riser and downcomer, the temperature is between 60° C. and 120° C. while the pressure ranges from 5 to 40 bar.

In some embodiments, the process for preparing the propylene ethylene copolymer component B) is carried out in presence of a highly stereospecific heterogeneous Ziegler-Natta catalyst. In some embodiments, the Ziegler-Natta catalysts are made from or contain a solid catalyst component made from or containing a titanium compound having a titanium-halogen bond and an electron-donor compound (internal donor), both supported on magnesium chloride. In some embodiments, the Ziegler-Natta catalysts systems are further made from or containing an organo-aluminum compound as a co-catalyst and optionally an external electron-donor compound.

In some embodiments, the catalysts systems are as described in the European Patent Nos. EP45977, EP361494, EP728769, and EP 1272533 and Patent Cooperation Treaty Publication No. W000163261.

In some embodiments, the solid catalyst component is made from or contains Mg, Ti, halogen and an electron donor selected from succinates of formula (I):

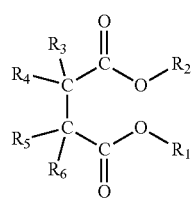

(I)

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the Periodic Table; the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms. In some embodiments, the radicals $R^3$ to $R^6$, which are joined to the same carbon atom, form a cycle.

In some embodiments, $R^1$ and $R^2$ are selected from the group consisting of $C_1$-$C_8$ alkyl, cycloalkyl, aryl, arylalkyl and alkylaryl groups.

In some embodiments, $R^1$ and $R^2$ are selected from primary alkyls, alternatively branched primary alkyls. In some embodiments, $R^1$ and $R^2$ groups are selected from the group consisting of methyl, ethyl, n-propyl, n-butyl, isobutyl, neopentyl, and 2-ethylhexyl. In some embodiments, $R^1$ and $R^2$ groups are selected from the group consisting of ethyl, isobutyl, and neopentyl.

In some embodiments, $R^3$ to $R^5$ are hydrogen and $R^6$ is a branched alkyl, cycloalkyl, aryl, arylalkyl and alkylaryl radical having from 3 to 10 carbon atoms. In some embodiments, at least two radicals from $R^3$ to $R^6$ are different from hydrogen and selected from $C_1$-$C_{20}$ linear or branched alkyl, alkenyl, cycloalkyl, aryl, arylalkyl or alkylaryl group, optionally containing heteroatoms belonging to groups.

In some embodiments, the two radicals different from hydrogen are linked to the same carbon atom. In some embodiments, the at least two radicals different from hydrogen are linked to different carbon atoms, that is (a) $R^3$ and $R^5$ or (b) $R^4$ and $R^6$.

In some embodiments, the solid catalyst component is prepared by reacting a titanium compound of formula $Ti(OR)_{n-y}X_y$ where n is the valence of titanium and y is a number between 1 and n with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts is as disclosed in U.S. Pat. Nos. 4,399,054 and 4,469,648. In some embodiments, the adduct is directly reacted with the Ti compound or subjected to thermal controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the temperature of the cold $TiCl_4$ is 0° C. In some embodiments, the treatment with $TiCl_4$ is carried out one or more times. In some embodiments, the internal donor is added during the treatment with $TiCl_4$. In some embodiments, the treatment with the electron donor compound is repeated one or more times. In some embodiments, the succinate of formula (I) is used in molar ratio with respect to the $MgCl_2$ of from 0.01 to 1, alternatively from 0.05 to 0.5. In some embodiments, the preparation of catalyst components in spherical form is as described in European Patent Application No. EP-A-395083 or Patent Cooperation Treaty Publication No. W098144001. In some embodiments, the solid catalyst components show a surface area (by B.E.T. method) between 20 and 500 m²/g, alternatively between 50 and 400 m²/g, and a total porosity (by B.E.T. method) higher than 0.2 cm³/g, alternatively between 0.2 and 0.6 cm³/g. In some embodiments, the porosity (Hg method) due to pores with radius up to 10.000 A ranges from 0.3 to 1.5 cm³/g, alternatively from 0.45 to 1 cm³/g.

In some embodiments, the organo-aluminum compound is an alkyl-Al selected from the trialkyl aluminum compounds. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the trialkylaluminum is mixed with alkylaluminum halides, alkylaluminum hydrides or alkylaluminum sesquichlorides such as AlEt$_2$Cl and Al$_2$Et$_3$Cl$_3$.

In some embodiments, the external electron-donor compounds are selected from the group consisting of silicon compounds, ethers, esters, amines, heterocyclic compounds, ketones and the 1,3-diethers. In some embodiments, the ester is ethyl 4-ethoxybenzoate. In some embodiments, the external electron-donor compound is 2,2,6,6-tetramethyl piperidine. In some embodiments, the external donor compounds are silicon compounds of formula $R_a^5R_b^6Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1-trifluoropropyl-2-ethylpiperidinyl-dimethoxysilane and 1,1,1-trifluoropropyl-methyldimethoxysilane. In some embodiments, the external electron donor compound is used in an amount to give a molar ratio between the organo-aluminum compound and the electron donor compound of from 0.1 to 500; alternatively from 1 to 100; alternatively from 2 to 50.

In some embodiments, the ratio amount of component A)/haze of the multilayer film is higher than 11; alternatively higher than 13; alternatively higher than 15;

In some embodiments, the film layers contain additives used for the film manufacturing, alternatively for the films used for packaging applications with automatic machines. In some embodiment, the additives are selected from the group consisting of anti-oxidants, process stabilizers, slip agents, antistatic agents, antiblock agents, and antifog agents.

In some embodiments, the overall film thickness is from 9 to 100 microns. In some embodiments, the thickness of the layer(s) A) is from 0.5 to 20 microns. In some embodiments, the thickness of the layer(s) B) is from 9.5 to 99.5 microns. In some embodiments, layer(s) B) is used as inner layer(s).

In some embodiments, the films are produced by extrusion processes.

In the extrusion processes, the polymer materials to be used for the various layers are molten in different extruders and extruded through a narrow die gap. In some embodiments, after exiting from the die, the material is cooled, heated and optionally oriented in several ways or in combination. In some embodiments, the processes are selected from the group consisting of cast, blown, extrusion coating, uniaxially oriented, simultaneously biaxially oriented, and sequential biaxially oriented film processes.

In some embodiments, the processes are selected from the group consisting of blown film and BOPP processes.

Blown Film

The molten polymer materials are forced through a circular shaped die.

The extrudate which is drawn off has the shape of a tube, which is inflated by air to form a tubular bubble. The bubble is cooled and collapsed before winding-up.

BOPP

The molten polymer materials are forced continuously through a narrow die. The extruded molten material is pulled away from the die and cooled, then heated again and stretched both in the Machine Direction (MD) and in the Transverse Direction (TD). After the stretching process, the film is cooled and then wound-up.

The following examples are given to illustrate, not to limit, the present disclosure:

EXAMPLES

Xylene-Soluble (XS) Fraction at 25° C.

Xylene Solubles at 25° C. were determined according to ISO 16 152; with solution volume of 250 ml, precipitation at 25° C. for 20 minutes, including 10 minutes with the solution in agitation (magnetic stirrer), and drying at 70° C.

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket, which permitted temperature control with a circulating thermostatic liquid. The downward passage of the meniscus was timed by a photoelectric device.

The passage of the meniscus in front of the upper lamp started the counter, which had a quartz crystal oscillator. The counter stopped as the meniscus passed the lower lamp and the efflux time was registered. The efflux time was converted into a value of intrinsic viscosity through Huggins' equation (Huggins, M. L., J. Am. Chem. Soc., 1942, 64, 2716), based upon the flow time of the solvent is at the same experimental conditions (same viscometer and same temperature). A single polymer solution was used to determine [η].

Determination of the Haze

Multilayer film specimens were prepared. The haze value was measured using a Gardner photometric unit connected to a Hazemeter type UX-10 or an equivalent instrument having G.E. 1209 light source with filter "C". Standard samples were used for calibrating the instrument according to ASTM D1003.

Ethylene Content in the Copolymers $^{13}$C NMR spectra were acquired on a Bruker AV-600 spectrometer equipped with cryoprobe, operating at 160.91 MHz in the Fourier transform mode at 120° C.

The peak of the Sββ carbon (nomenclature according to "Monomer Sequence Distribution in Ethylene-Propylene Rubber Measured by $^{13}$C NMR. 3. Use of Reaction Probability Mode" C. J. Carman, R. A. Harrington and C. E. Wilkes, Macromolecules, 1977, 10, 536) was used as an internal standard at 29.9 ppm. The samples were dissolved in 1,1,2,2-tetrachloroethane-d2 at 120° C. with an 8% wt/v concentration. Each spectrum was acquired with a 90° pulse, and 15 seconds of delay between pulses and CPD to remove $^1$H-$^{13}$C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP=100T\beta\beta/S \quad PPE=100T\beta\delta/S \quad EPE=100T\delta\delta/S$$

$$PEP=100S\beta\beta/S \quad PEE=100S\beta\delta/S \quad EEE=100(0.25S\gamma\delta+0.5S\delta\delta)/S$$

$$S=T\beta\beta+T\beta\delta+T\delta\delta+S\beta\beta+S\beta\delta+0.25S\gamma\delta+0.5S\delta\delta$$

The molar percentage of ethylene content was evaluated using the following equation:

$$E\% \text{ mol} = 100 * [PEP + PEE + EEE]$$

The weight percentage of ethylene content was evaluated using the following equation:

$$100 * E\% \text{ mol} * MWE$$

$$E\% \text{ wt.} = E\% \text{ mol} * MWE + P\% \text{ mol} * MWP$$

where P % mol was the molar percentage of propylene content while MWE and MWP were the molecular weights of ethylene and propylene, respectively.

The product of reactivity ratio r1r2 was calculated according to Carman (C. J. Carman, R. A. Harrington and C. E. Wilkes, Macromolecules, 1977; 10, 536) as:

$$r_1 r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mmT$_{\beta\beta}$ (28.90-29.65 ppm) and the whole T$_{\beta\beta}$ (29.80-28.37 ppm).

Oxygen Transmission (OTR)

Measured on a Mocon OX-TRAN 2/60 unit, commercially available from Mocon, Inc., according to ASTM D3985-05(2010)e1 at 23° C., 0% relative humidity (RH), and 100% 02.

Water Vapor Transmission (WVTR)

Measured on a Mocon PERMATRAN W3/33 unit, commercially available from Mocon, Inc. according to ASTM F1249 at 37.8° C. and 90% relative humidity (RH).

Component A

Component A was Moplen HP522H propylene homopolymer, commercially available from LyondellBasell, having a MFR of 2.0 g/10 min and a solubility in xylene at 25° C. of 4.9 wt %.

Component B1

Preparation of the Ziegler-Natta solid catalyst component

The Ziegler-Natta catalyst was prepared as described for Example 5, lines 48-55, of European Patent No. EP728769B1.

Preparation of the catalyst system—Precontact

Before introducing the solid catalyst component into the polymerization reactors, the solid catalyst component was contacted with aluminum-triethyl (TEAL) and with the dicyclopentyldimethoxysilane (D donor) under the conditions reported in Table 1.

Prepolymerization

The catalyst system was then subjected to prepolymerization treatment at 20° C. by maintaining the catalyst system in suspension in liquid propylene for a residence time of 9 minutes before introducing the catalyst system into the polymerization reactor.

Polymerization

The polymerization was carried out in gas-phase polymerization reactor including two interconnected polymerization zones, a riser and a downcomer, as described in European Patent No. EP782587. Hydrogen was used as molecular weight regulator. The polymer particles exiting from the polymerization step were subjected to a steam treatment to remove the unreacted monomers and dried under a nitrogen flow.

The main precontact, prepolymerization and polymerization conditions and the quantities of monomers and hydrogen fed to the polymerization reactor are reported in Table 1.

TABLE 1

| Component B1 | | |
|---|---|---|
| PRECONTACT | | |
| Temperature | ° C. | 15 |
| Residence Time | min | 13 |
| TEAL/catalyst | wt/wt | 6 |
| TEAL/Ext. Donor | g/g | 4 |
| PREPOLYMERIZATION | | |
| Temperature | ° C. | 20 |
| Residence Time | min | 8 |
| POLYMERIZATION | | |
| Temperature | bar-g | 65 |
| Pressure | bar-g | 24 |
| Residence Time | min | 120 |
| Mileage | kg/kg | 37000 |
| Split holdup riser | wt % | 40 |
| Split holdup downcomer | wt % | 60 |
| $C_2^-/C_2^- + C3^-$ riser | mol/mol | 0.018 |
| $C_2^-/C_2^- + C3^-$ downcomer | mol/mol | 0.041 |
| $H_2/C_3^-$ riser | mol/mol | 0.023 |
| $H_2/C_2^-$ downcomer | mol/mol | 0.23 |

Component B2 and B3 (comparative)

Component B2 was obtained by blending 30% of Adflex C200F propylene copolymer, commercially available from LyondellBasell, and 70% of Moplen RP320M propylene random copolymer, commercially available from LyondellBasell.

Component B3 was Adflex C200F propylene copolymer, commercially available from LyondellBasell.

The properties of components B1, B2 and B3) are reported in Table 2.

TABLE 2

| | | B1 | B2 | B3 |
|---|---|---|---|---|
| Ethylene content | Wt % | 7.6 | 6.6 | 14.9 |
| Xylene soluble at 25° C. | Wt % | 19.4 | 19.4 | 51.2 |
| Intrinsic viscosity xylene solubles | dl/g | 1.94 | 1.96 | 2.24 |
| MFR | g/10 min | 1.8 | | 6.0 |
| Ethylene in the fraction insoluble in xylene at 25° C. | Wt % | 4.3 | 3.1 | 6.2 |
| Ethylene in the fraction soluble in xylene at 25° C. | Wt % | 20.1 | 25.0 | 24 |
| PEP sequences in the fraction insoluble in xylene at 25° C. | Mol % | 4.3 | 3.1 | 3.7 |
| PEP sequences in the fraction soluble in xylene at 25° C. | Mol % | 12.9 | 12.3 | 12.1 |
| PEE sequences in the fraction soluble in xylene at 25° C. | Mol % | 9.7 | 12.7 | 12.5 |
| EEE sequences in the fraction soluble in xylene at 25° C. | Mol % | 4.8 | 8.4 | 7.7 |
| r1r2 in the fraction insoluble in xylene at 25° C. | | 3.6 | 5.4 | 6.8 |

Examples 1-2 and Comparative Examples 3-4

Components A and B were blended in various percentages, as reported in Table 3:

TABLE 3

| components | | Ex 1 | Comp 2 | Ex 3 | Comp 4 |
|---|---|---|---|---|---|
| A | Wt % | 70 | 70 | 60 | 60 |
| B1 | Wt % | 30 | | 40 | |
| B3 | Wt % | | 30 | | 40 |

BOPP A/B/A films were produced. The B layer was made with the compositions of Examples 1-2 and Comparative Examples 3-4, while the A layer was Moplen HP522H propylene homopolymer, commercially available from LyondellBasell. The thickness of the films was 30 microns, with the A layer being 1 micron. The results of the analysis of the films are reported in Table 4.

TABLE 4

| components | | Ex 1 | Comp 2 | Ex 3 | Comp 4 |
|---|---|---|---|---|---|
| WVTR | cc/m$^2$ × day | 5.97 | 6.44 | 6.1 | 6.99 |
| OTR | cc/m$^2$ × day | 2338 | 2394 | 2485 | 3359 |
| haze | % | 1.67 | 5.20 | 2.30 | 6.32 |

What is claimed is:

1. A multilayer film comprising:
a core layer comprising
a polypropylene composition comprising
A) from 80 wt % to 65 wt %; of a propylene homopolymer having a fraction insoluble in xylene at 25° C. greater than 90 wt %, based upon the total weight of the propylene homopolymer; and
B) from 20 wt % to 35 wt %; of a propylene ethylene copolymer having:
  i) xylene soluble fraction at 25° C. ranging from 14 wt % to 27 wt %, based upon the total weight of the propylene ethylene copolymer;
  ii) intrinsic viscosity of the fraction soluble in xylene at 25° C. ranging from 1.0 to 2.4 dl/g;
  iii) melt flow rate, MFR, measured according to ISO 1133 at 230° C. with a load of 2.16 kg, ranging from 1.0 g/10 min to 4.0 g/10 min;
  iv) an ethylene derived units content ranging from 5.0 wt % to 8.0 wt %, based upon the total weight of the propylene ethylene copolymer;
  v) the ethylene derived units content on the fraction insoluble in xylene at 25° C. ranging from 2.5 wt % to 6.0 wt %, based upon the total weight of the propylene ethylene copolymer;
  vi) the ethylene derived units content on the fraction soluble in xylene at 25° C. ranging from 15.2 wt % to 30.2 wt %, based upon the total weight of the propylene ethylene copolymer; and
  vii) the C$^{13}$ NMR sequences PEP measured on the fraction insoluble in xylene at 25° C. ranging from 3.5 mol % to 5.5 mol % and the C$^{13}$ NMR sequences PEP measured on the fraction soluble in xylene at 25° C. ranging from 11.0 mol % to 14.2 mol %;
the sum of A) and B) being 100 wt %.

2. The multilayer film according to claim 1, wherein in component B) the xylene soluble fraction at 25° C. ranges from 17 wt % to 25 wt %, based upon the total weight of the propylene ethylene copolymer.

3. The multilayer film according to claim 1, wherein in component B) the intrinsic viscosity of the fraction soluble in xylene at 25° C. ranges from 1.5 to 2.2 dl/g.

4. The multilayer film according to claim 1, wherein in component B) the melt flow rate, MFR, measured according to ISO 1133 at 230° C. with a load of 2.16 kg, ranges from 1.4 g/10 min to 3.2 g/10 min.

5. The multilayer film according to claim 1, wherein in component B) the C$^{13}$ NMR sequences PEP measured on the fraction insoluble in xylene at 25° C. ranges from 3.8 mol % to 5.2 mol %; and the C$^{13}$ NMR sequences PEP measured on the fraction soluble in xylene at 25° C. ranges from 11.5 mol % to 13.8 mol %.

6. The multilayer film according to claim 1, wherein in component B) the C$^{13}$ NMR sequences PEP measured on the fraction insoluble in xylene at 25° C. ranges 3.9 mol % to 4.8 mol %; and the C$^{13}$ NMR sequences PEP measured on the fraction soluble in xylene at 25° C. ranges 12.3 mol % to 13.5 mol %.

7. The multilayer film according to claim 1, wherein in component B) the ethylene derived units content on the fraction insoluble in xylene at 25° C. ranges from 3.2 wt % to 5.2 wt %, based upon the total weight of the propylene ethylene copolymer.

8. The multilayer film according to claim 1, wherein in component B) the ethylene derived units content on the fraction soluble in xylene at 25° C. ranges from 17.2 wt % to 24.8 wt %, based upon the total weight of the propylene ethylene copolymer.

9. The multilayer film according to claim 1, wherein in component B) the C$^{13}$ NMR sequences PEE measured on the fraction soluble in xylene at 25° C. range from 7.2 mol % to 12.0 mol %.

10. The multilayer film according to claim 1, wherein in component B) the C$^{13}$ NMR sequences EEE measured on the fraction soluble in xylene at 25° C. are lower than 6.5 mol %.

11. The multilayer film according to claim 1, wherein the ratio amount of component A)/haze of the multilayer film is higher than 11.

12. The multilayer film according to claim 1, wherein in component B) the ratio r1/r2 of the fraction insoluble in xylene at 25° C. measured with C$^{13}$ NMR is between 2.4 and 4.6.

13. The multilayer film according to claim 1, wherein in component A) the fraction insoluble in xylene at 25° C. is greater than 94 wt %, based upon the total weight of the propylene homopolymer.

* * * * *